US010503977B2

(12) United States Patent
Severn et al.

(10) Patent No.: US 10,503,977 B2
(45) Date of Patent: Dec. 10, 2019

(54) DISPLAYING AUGMENTED IMAGES VIA PAIRED DEVICES (71) Applicant: Hewlett-Packard Development Company, L.P., Houston, TX (US)

(72) Inventors: Robert Severn, San Francisco, CA (US); David Clinton Joiner, Alpharetta, GA (US); Andrew Joiner, Alpharetta, GA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/743,552

(22) PCT Filed: Sep. 18, 2015

(86) PCT No.: PCT/US2015/051000
§ 371 (c)(1),
(2) Date: Jan. 10, 2018

(87) PCT Pub. No.: WO2017/048286
PCT Pub. Date: Mar. 23, 2017

(65) Prior Publication Data
US 2018/0197009 A1 Jul. 12, 2018

(51) Int. Cl.
*G06T 19/00* (2011.01)
*G06K 9/00* (2006.01)
(Continued)

(52) U.S. Cl.
CPC ..... *G06K 9/00671* (2013.01); *G06F 3/04842* (2013.01); *G06F 3/147* (2013.01);
(Continued)

(58) Field of Classification Search
None
See application file for complete search history.

(56) References Cited

U.S. PATENT DOCUMENTS 8,866,849 B1 * 10/2014 Cho ................... G02B 27/0172
345/633
2009/0034498 A1 * 2/2009 Banerjea ............... H04W 76/15
370/338
(Continued)

FOREIGN PATENT DOCUMENTS

EP 2355009 8/2011
KR 10-0777215 11/2007
(Continued)

OTHER PUBLICATIONS

Augmented Smartwatch Pro, (Web Page) Aug. 26, 2015—5 pages.
(Continued)

*Primary Examiner* — David H Chu
(74) *Attorney, Agent, or Firm* — HP Inc. Patent Department (57) ABSTRACT Examples associated with displaying augmented images via paired devices are disclosed. Providing a trigger image from a mobile device to a paired device. The paired device is controlled to display the trigger image. The mobile device scans the trigger image being displayed on the paired device. An augmented image of the trigger image is displayed on the mobile device.

13 Claims, 7 Drawing Sheets (51) Int. Cl.
*G06T 11/00* (2006.01)
*G06F 3/0484* (2013.01)
*G06T 11/60* (2006.01)
*G09G 5/00* (2006.01)
*G06F 3/14* (2006.01)
*G06F 3/147* (2006.01)

(52) U.S. Cl.
CPC ....... *G06F 3/1454* (2013.01); *G06K 9/00979* (2013.01); *G06T 11/00* (2013.01); *G06T 11/60* (2013.01); *G06T 19/006* (2013.01); *G09G 5/00* (2013.01); *G09G 2340/04* (2013.01); *G09G 2340/045* (2013.01); *G09G 2340/0442* (2013.01); *G09G 2340/12* (2013.01)

(56) References Cited

U.S. PATENT DOCUMENTS

| | | | |
|---|---|---|---|
| 2009/0109240 A1* | 4/2009 | Englert | G06T 19/006 345/633 |
| 2011/0221771 A1* | 9/2011 | Cramer | G06Q 30/02 345/633 |
| 2012/0206558 A1 | 8/2012 | Setton | |
| 2012/0218299 A1* | 8/2012 | Hayakawa | A63F 13/06 345/633 |
| 2013/0100165 A1* | 4/2013 | Komiyama | G09G 5/397 345/634 |
| 2013/0293581 A1 | 11/2013 | Wissner-Gross et al. | |
| 2013/0315445 A1 | 11/2013 | Schlieski et al. | |
| 2014/0028713 A1* | 1/2014 | Keating | G06T 19/006 345/633 |
| 2014/0310056 A1* | 10/2014 | Alapati | G06Q 50/01 705/7.28 |
| 2014/0340423 A1* | 11/2014 | Taylor | A63F 13/655 345/633 |
| 2015/0127365 A1 | 5/2015 | Rizvi et al. | |
| 2017/0004382 A1* | 1/2017 | Inoue | G06T 19/006 |

FOREIGN PATENT DOCUMENTS

| | | |
|---|---|---|
| KR | 101314865 | 11/2007 |
| KR | 10-1314865 | 10/2013 |
| WO | WO-2014145532 | 9/2014 |

OTHER PUBLICATIONS

IKEA Augmented Reality, (Web Page), Jul. 1, 2014—2 pages.
Jackson W, Pro Android Wearables: Building Apps for Smartwatches, (Web Page), Jun. 30, 2015—1 page.
Metaio Presents Augmented Reality for Smart Watches, (Web Page), Jul. 8, 2014—3 pages.
Stanimirovic etal—"Smartwatch-aided Handheld Augmented Reality", (Research Paper), Jul. 9, 2014—2 pages.

\* cited by examiner

DISPLAYING AUGMENTED IMAGES VIA PAIRED DEVICES

BACKGROUND

The concept of augmented reality covers a package of technologies used to digitally overlay information on top of real world content. In various examples, this may be performed in conjunction with a display through which the user views the real world content. By way of illustration, certain digital eyepieces may display directions, advertisements, and so forth as a user wearing the digital eyepiece moves throughout a town. In other examples, a user may point their cellphone camera at a trigger image (e.g., an object, a landmark, a picture) and the display on the cellphone may present the user with an augmented image that overlays the trigger image.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems, methods, and equivalents associated with displaying augmented images via paired devices are described. As discussed above, certain augmented reality techniques work when a user points, for example, a camera at a trigger image causing an augmented image to be shown on a display associated with the camera. For example, a user may point a cellphone camera at a trigger image and the augmented image may be shown on the phone's corresponding liquid crystal display. This functions smoothly when the user is able to physically access a trigger image. However, if there is no trigger image around the user for the user to scan, that user may be unable to experience the augmented image.

Printing a copy of the trigger image may be resource intensive and compel a user to have access to a printer of suitable quality. Accessing a copy of the trigger image on another device may tie the user to a specific location or compel the user to carry around multiple network connected devices. Displaying a trigger image on a device on which the trigger image is to be scanned may also not function because of difficulties in scanning trigger images and displaying them on the same device. Essentially, a device may encounter difficulties scanning itself.

Consequently, if a mobile device is paired with a wearable device such, as a smartwatch, the smartwatch may be able to be controlled to display the trigger image, allowing the mobile device to scan the trigger image and show the augmented image on a display of the mobile device. This may allow a user to conveniently select from a set of trigger images, cause a selected trigger image to be shown on the paired device, and scan the trigger image into the mobile device, allowing the user to view the augmented image.

Figure 1:
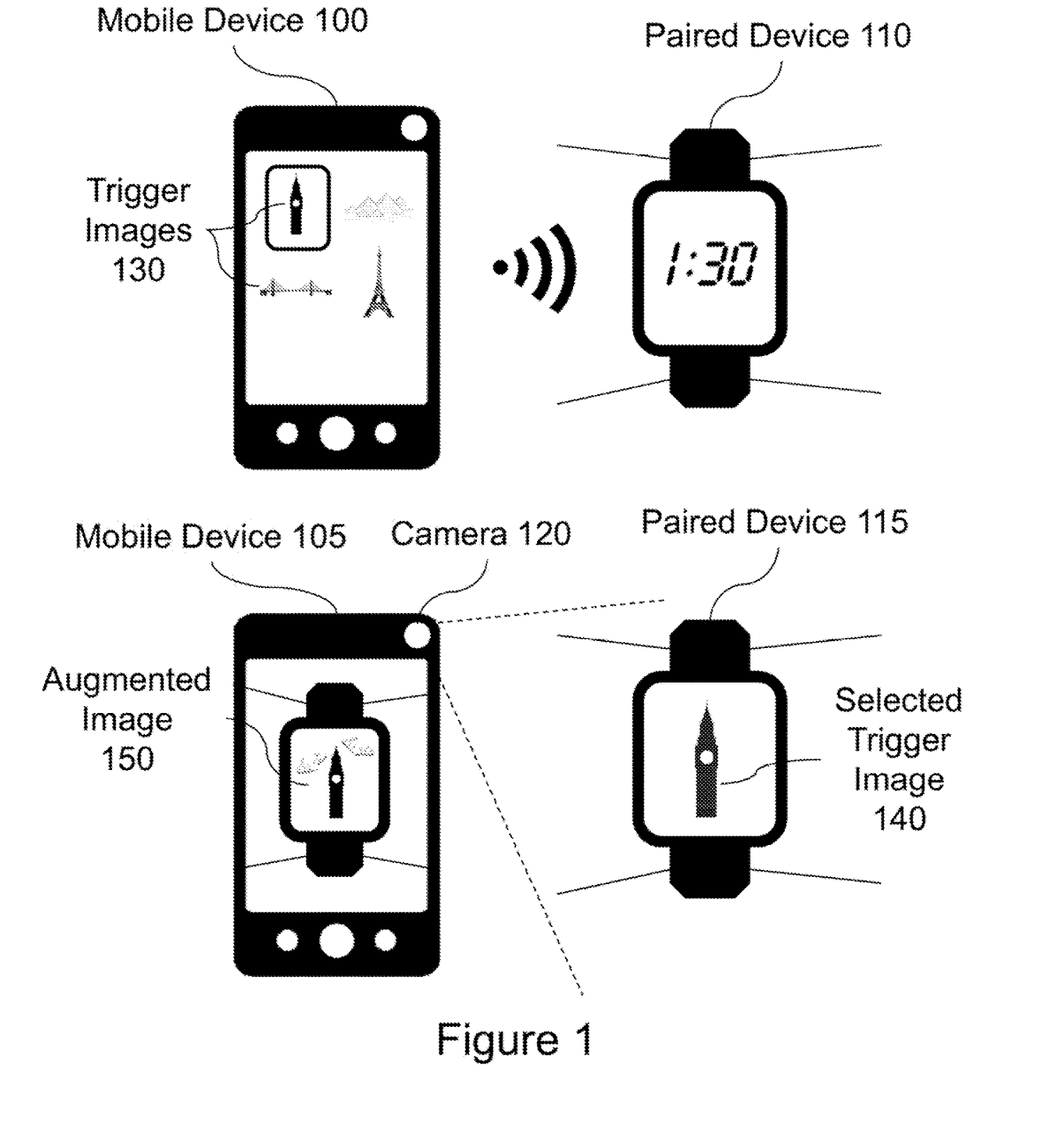
FIG. 1 illustrates example mobile devices and pa devices associated with displaying augmented images via paired devices.

FIG. 1 illustrates example mobile devices and paired devices, associated with displaying augmented images via paired devices. It should be appreciated that the items depicted in FIG. 1 are illustrative examples and many different devices, and so forth may operate in accordance with various examples.

FIG. 1 illustrates example mobile devices 100, 105 and paired devices 110, 115 associated with displaying augmented images via paired devices. Here, mobile devices 100 and 105 are depicted as cellphones and paired devices 110 and 115 are depicted as smartwatches, though other devices may also be used. In this example, mobile devices 100 and 105 may be the same mobile device in two different states at two different points in time. Further, paired devices 110 and 115 may also be the same paired device in two different states at points, in time that correspond to the points in time associated with mobile devices 100 and 105 respectively. In this example, paired devices 110 and 115 are illustrated as being worn around a wrist (not labeled) of a user.

Consequently, mobile device 100 and paired device 110 may be associated with a point in time at which a user is selecting a trigger image from a set of trigger images 130. In this example, the augmented reality application may be associated with a game and/or set of advertisements that depict an alien invasion occurring at various well known landmarks. Consequently, set of trigger images 130 includes several famous locations including Big Ben in London, the Great Pyramids in Egypt, the Golden Gate Bridge in San Francisco, Calif., and the Eiffel Tower in France.

Here, a user has selected Big Ben, as indicated in this example by the box surrounding that trigger image. At this point mobile device 100 may transmit the selected trigger image 140 of Big Ben to paired device 110. In this example, selected trigger image 140 is transmitted via a wireless transmission signal (e.g., Wi-Fi, Bluetooth), though other techniques including a wired technique may also be possible. Prior to receiving selected trigger image 140 from mobile device 100, paired device 110 may be performing some other function or be operating in an idle mode. In this example, paired device 110 is displaying the current time prior to receiving selected trigger image 140 from mobile device 100.

In some examples, the act of receiving selected trigger image 140 may cause paired device 110 to begin displaying selected trigger image 140. In other examples, paired device 110 may wait for another signal from mobile device 100 to begin displaying selected trigger image 140. In either case, at some point after receiving selected trigger image 140, paired device 110 may begin displaying selected trigger image 140, transitioning paired device 110 to a state as depicted for paired device 115.

At this point mobile device 105 may begin scanning for selected trigger image 140 using a camera 120 embedded into mobile device 105. Further, a feed from camera 120 may replace the set of trigger images on a display of mobile device 105. When mobile device 105 detects selected trigger image 140, mobile device 105 may begin overlaying augmented image 150 on top of the selected trigger image 140 on the display of mobile device 105. In this example, augmented image 150 causes flying saucers to be shown floating around Big Ben. In other examples, selected trigger image 140 may be completely overlaid by augmented image 150, obscuring the trigger image. This may be appropriate if, for example, augmented image 150 is an animated version of selected trigger image 140, or if selected trigger image 140 serves as a signal to replace selected trigger image 140 with the augmented image.

In other examples, paired devices and mobile devices may support additional interactions. For example, it may be desirable to notify a user when that user comes within a physical proximity of a trigger image in the real world (e.g., not displayed or printed on media by the user). In this case, it may be desirable to notify the user of their proximity to such a trigger image via the paired device. The mobile device may be able to detect the physical proximity by, for example, knowing GPS coordinates of the trigger image, or receiving a signal from the trigger image or a device near the trigger image (e.g., over Wi-Fi or Bluetooth). Once this proximity is detected, the mobile device may push a notification to, the paired device to suggest to the user that they should search for the trigger image.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module" as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
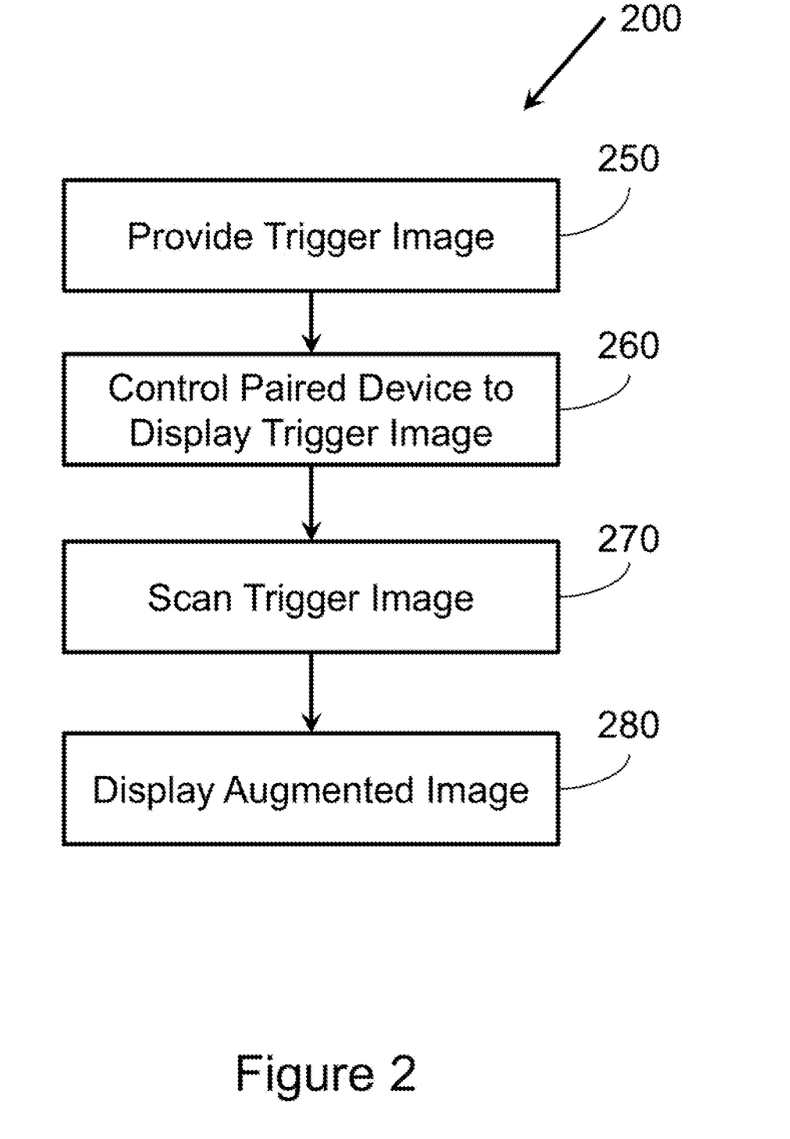
FIG. 2 illustrates a flowchart of example operations associated with, displaying augmented images via paired devices.

FIG. 2 illustrates an example method 200 associated with displaying augmented images via paired devices. Method 200 may be embodied on a non-transitory computer-readable medium storing processor-executable instructions. The instructions, when executed by a processor, may cause the processor to perform method 200. In other examples, method 200 may exist within logic gates and/or RAM of an application specific integrated circuit (ASIC).

Method 200 includes providing a trigger image at 250. As used herein, a trigger image generally refers to any image that can be detected by, for example, a camera, which will cause an augmented image to be shown overlaying the trigger image or in association with the trigger image. Though generally, physical objects may server as trigger images in certain examples herein, in others, a trigger image more specifically refer to a digital representation of the object such that the digital representation can be transmitted between devices, shown on displays of various devices, and ultimately scanned in and detected as if the trigger image had been scanned in as if found in reality.

The trigger image may be provided from a mobile device to a paired device. A mobile device, as used herein, may generally be a network capable device having a display and an optical input mechanism (e.g., a camera). Often, a mobile device will be a cellphone, though a tablet or other devices may also serve as a mobile device. A paired device may be a non-network capable device (though the paired device may be able to access a network via the mobile device) that is operably connected to the mobile device, whether by a wireless technology (e.g., Bluetooth) or a wired technology. The paired device will have a display and may operate in, conjunction with the mobile device to realize many capabilities of the paired device. By way of illustration, a wearable such as a smartwatch may be able to perform limited timekeeping functions, but when paired with a cell phone, can receive and transmit text messages, and so forth.

Method 200 also includes controlling the paired device to display the trigger image at 260. As discussed above, the act of providing the trigger image to the paired device may effectively control the paired device to display the trigger image. In other examples, a separate signal may cause the paired device to display the trigger image. The separate signal may be desirable to, for example, better coordinate detection of the trigger image, preserve resources (e.g., battery) of the mobile device and/or paired device, and so forth.

Method 200 also includes scanning the trigger image at 270. The trigger image may be scanned into the mobile device as it is being displayed by the paired device. The scanning may be achieved using a camera embedded in the mobile device.

Method 200 also includes displaying an augmented image at 280. The augmented image may be displayed on the mobile device. The augmented image may include at least a portion of the trigger image. In some examples the augmented image may be animated. As used herein, an augmented image may be content that is displayed in relationship to the trigger image. The augmented image may replace the trigger image, modify a portion of the trigger image, overlay a portion of the trigger image, and so forth. In the example illustrated in FIG. 1, the flying saucers shown in augmented image 150 may be shown flying around landmarks without ever significantly obscuring the landmarks. Alternatively, the flying saucers may be shown abducting, destroying or otherwise interacting with the landmark.

Figure 3:
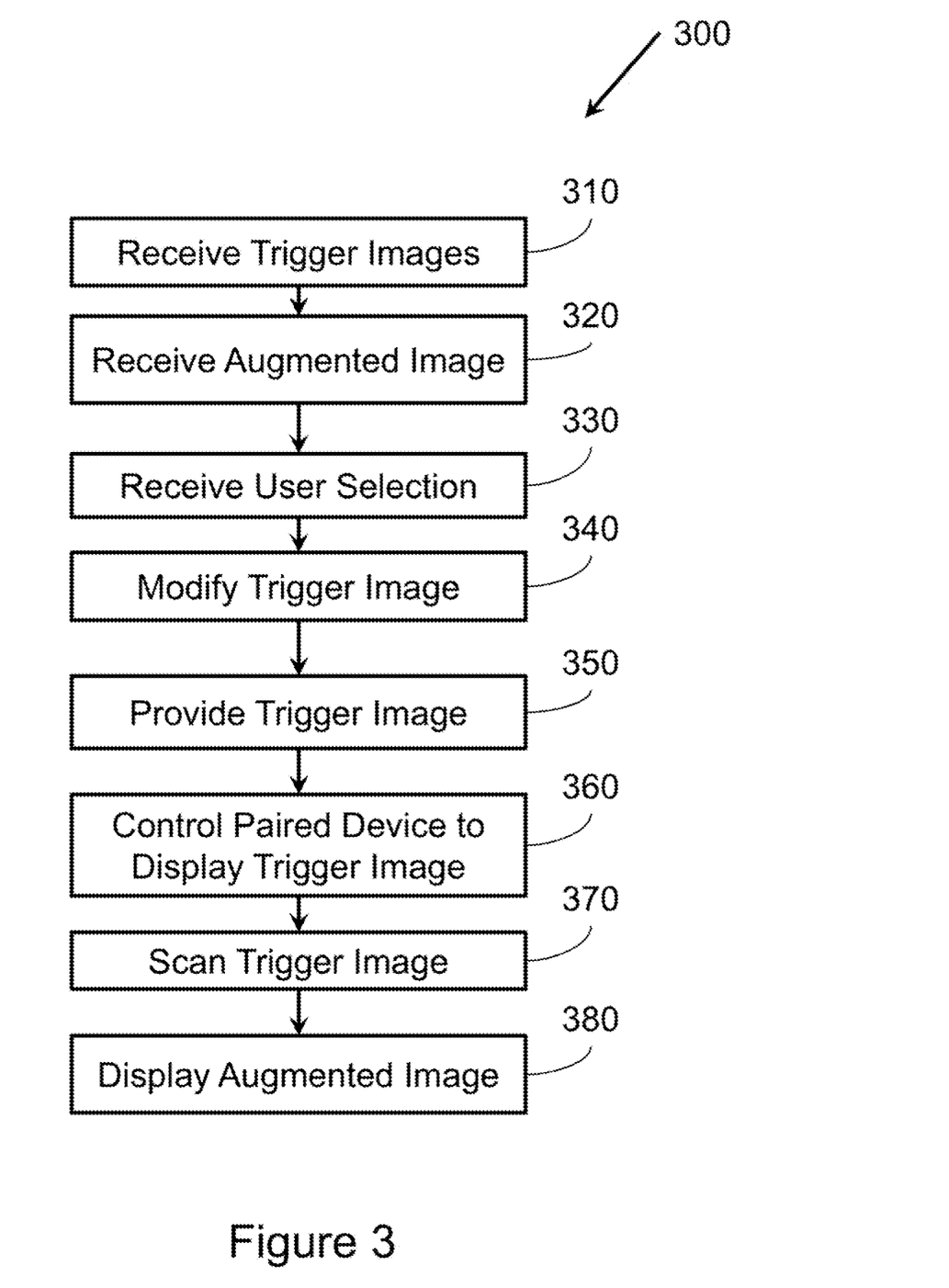
FIG. 3 illustrates another flowchart of example operations associated with displaying augmented images via paired devices.

FIG. 3 illustrates a method 300 associated with displaying augmented images via paired devices. Method 300 includes several actions similar to those described above with reference to method 200 (FIG. 2). For example, method 300 includes providing a trigger image to a paired device at 350, controlling the paired device to display the trigger image at 360, scanning the trigger image at 370, and displaying an augmented image at 380.

Method 300 also includes receiving a set of trigger images at 310. The trigger images may be received from a trigger image distributer. The trigger image distributer may be, for example, a server that distributes trigger images and augmented images. This server may be run, for example, by a company that generally distributes trigger images on behalf of companies running campaigns. In other examples, the server may be run by a company that offers a service to users (e.g., a game), and the server may provide trigger images and augmented images associated specifically with that service.

Method 300 also includes receiving the augmented image at 320. In various example, the augmented image may also be received from the trigger image distributer.

Method 300 also includes receiving a user selection at 330. The user selection may be of the trigger image. For example, the user may select the trigger image from a set of trigger images. This may mean that members of the set of trigger images are also provided at some point to the user prior to receiving the user selection. The trigger images may be provided, for example, using a display of the mobile device.

Method 300 also includes modifying the trigger image at 340. The trigger mage may be modified to comply with a display of the paired device. By way of illustration, depending on a screen size and/or other technical attributes of the paired device, the trigger image may need to be resized, and or otherwise modified so that the paired device can properly display the trigger image. For example, if the trigger image is in color but the paired device can display shades of grey, the trigger image may be recolored to be better shown on the paired device and/or scanned by the mobile device. Similarly, if the trigger image has a higher image quality than is displayable on the paired device (e.g., based on pixels per square inch), the trigger image may be modified for display on the paired device while retaining information important for detection by the mobile device when scanning the trigger image at 370, information important to the augmented image, and so forth.

Figure 4:
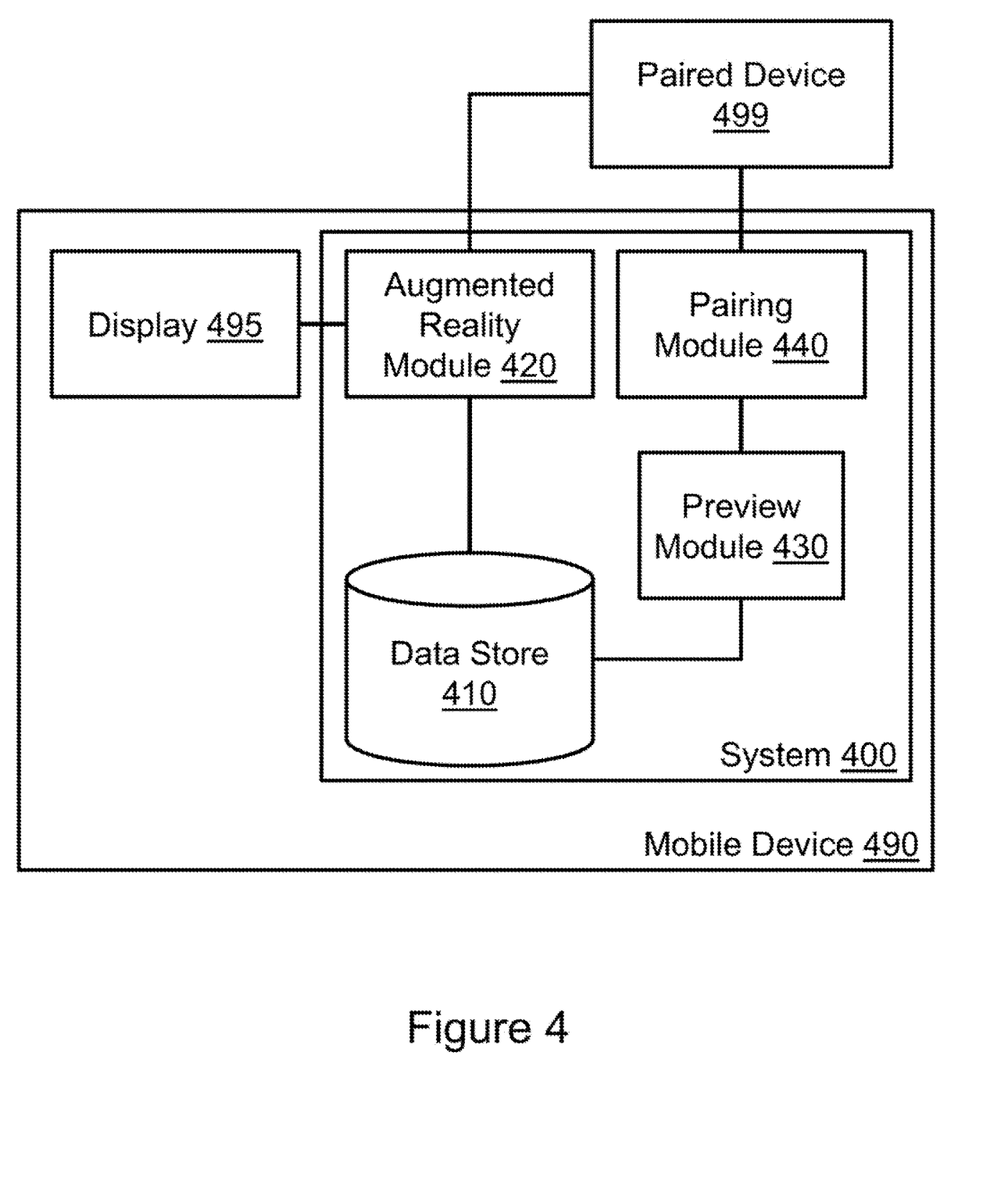
FIG. 4 illustrates an example client system associated with displaying augmented images via paired devices.

FIG. 4 illustrates a system 400 associated with displaying augmented images via the paired device. System 400 may reside within a mobile device 490. Mobile device 490 may be, for example, a cellphone, a tablet, a laptop computer, and so forth. Mobile device 490 may include a display 495.

System 400 includes a data store 410. Data store 410 may store a set of trigger images. Data store 410 may also store augmented images that correspond to members of the set of trigger images. The display may reside in a memory (not shown) of mobile device 490.

System 400 also includes an augmented reality module 420. Augmented reality module 420 may detect a trigger image. In various examples, augmented reality module 420 may detect the trigger image via an optical device (e.g., a camera) (not shown) associated with mobile device 490. Upon detecting the trigger image, augmented reality module 420 may cause an augmented image that corresponds to the trigger image to be shown on display 495.

System 400 also includes a preview module 430. Preview module 430 may allow a user to browse members of the set of trigger images stored in data store 410. In various examples, preview module 430 may allow browsing of the trigger images via display 495 of mobile device 490. Preview module 430 may also receive an input associated with a selected trigger image from the user. This selection may be received via an input device (not shown) of mobile device 490. The input device may be, for example, a touch screen, a keypad, and so forth and may depend on whether mobile device 490 is a cellphone, a computer, or another type of mobile device.

System 400 also includes a pairing module 440. Pairing module 440 may control a paired device 499 to display the selected trigger image. The paired device displaying the selected trigger image may facilitate detection of the selected trigger image by augmented reality module 420. This may allow augmented reality module 420 to cause an augmented image associated with the selected trigger image to be shown on display 495 of mobile device 490. Paired device 499 may be, for example, a smartwatch, or another type of device having a display. It may be desirable that the paired device be operably connected yet structurally distinct from mobile device 490 so that the optical input device of mobile device 490 can capture what is shown on the display of the paired device. Controlling paired device 499 to display the selected trigger image may include transmitting the trigger image to paired device 499, modifying the trigger image to conform to attributes of a display of paired device 499, and so forth.

Figure 5:
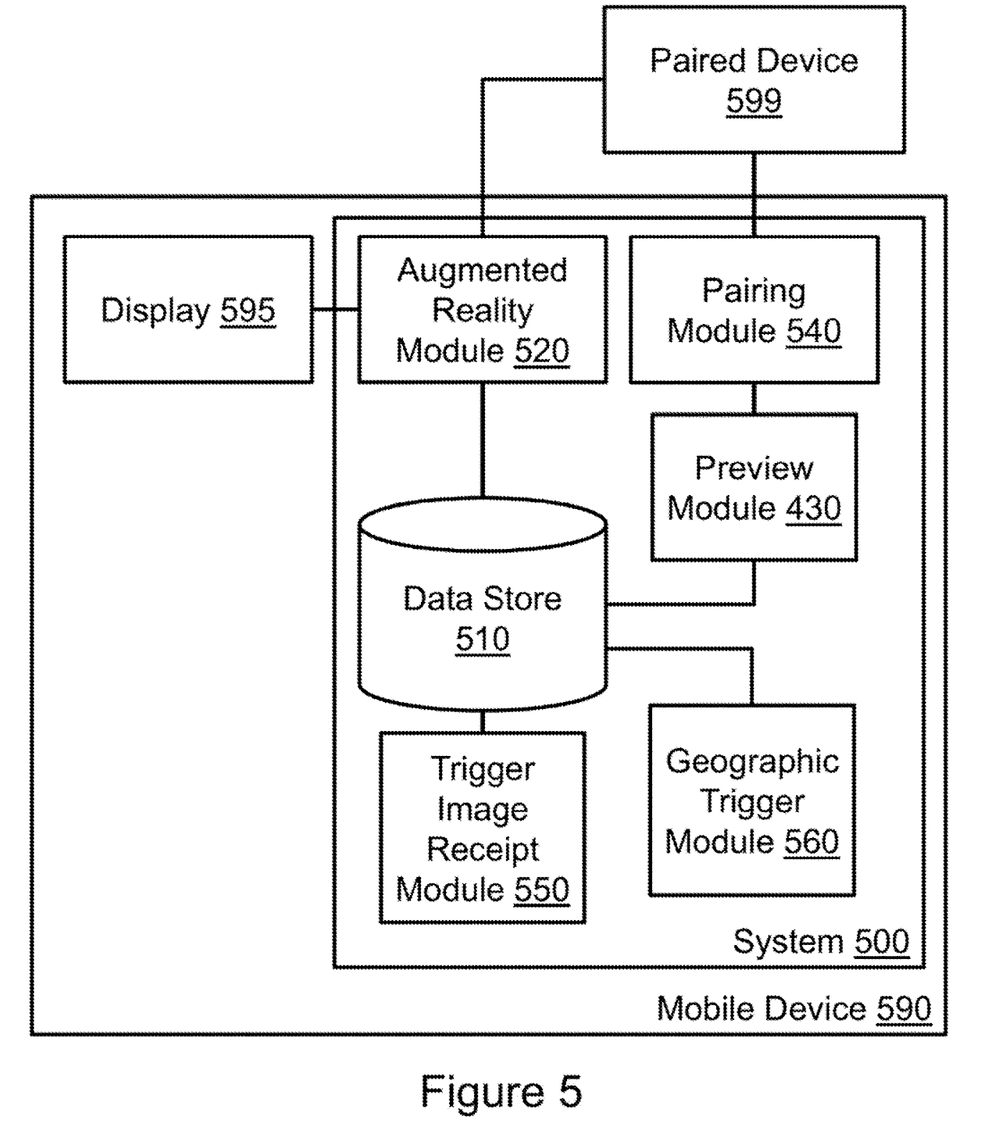
FIG. 5 illustrates another example client system associated with displaying augmented images via paired devices.

FIG. 5 illustrates a system 500 associated with displaying augmented images via paired devices. System 500 includes several items similar to those described above with reference to system 400 (FIG. 4). For example, system 500 includes a data store 510, an augmented reality module 520, a preview module 430, and a pairing module 540 to control a paired device 599. Further, system 500 may reside within a mobile device 590 having a display 595.

System 500 also includes a trigger image receipt module 550. Trigger image receipt module 550 may receive trigger images and corresponding images from a control server (not shown). Trigger image receipt module 550 may also store the received trigger images and corresponding augmented images in data store 510. Depending on how trigger image receipt module 550 is designed to operate, trigger image receipt module 550 may pull trigger images and augmented images from the control server under certain circumstances, or the trigger images and augmented images may be periodically pushed to trigger image receipt module 550 by the control server.

System 500 also includes a geographic trigger module 560. Geographic trigger module may detect a physical proximity of mobile device 590 to a trigger image and notify the user of the physical proximity. The physical proximity may be detected based on, for example, a GPS position of mobile device 590 and/or paired device 599. In other examples, the physical proximity may be detected upon receipt of a signal (e.g., over Bluetooth, over Wi-Fi) from a device located near the trigger image. In, some examples, geographic trigger module 560 may alert the user via paired device 599.

Figure 6:
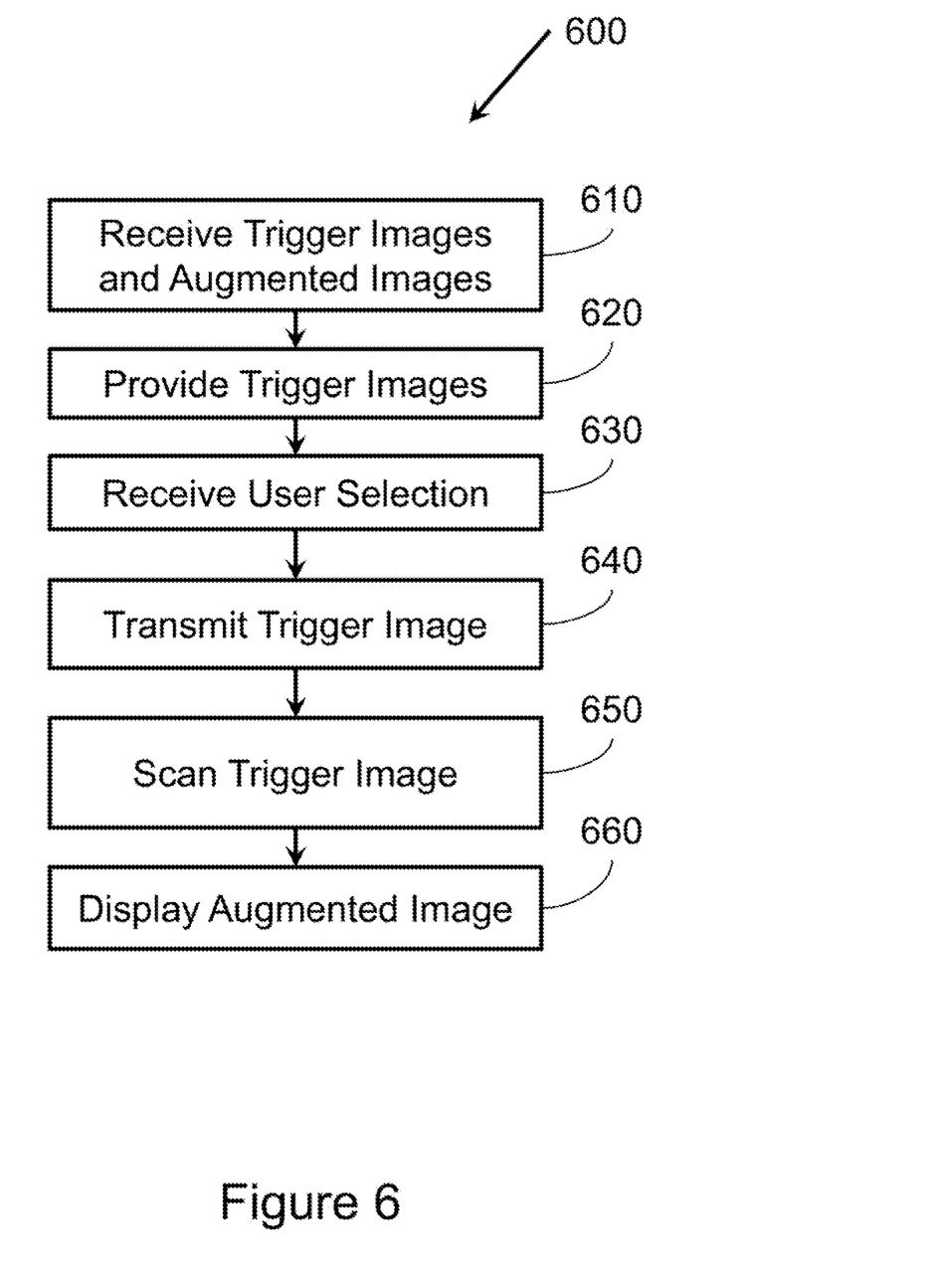
FIG. 6 illustrates another flowchart of example operations associated with displaying augmented images via paired devices.

FIG. 6 illustrates a method 600. Method 600 may be embodied on a non-transitory computer-readable medium storing processor-executable instructions. The instructions, when executed by a computer, may cause the computer to perform method 600. In other examples, method 600 may exist within logic gates and/or RAM of an application specific integrated circuit (ASIC). In this example, the computer may be embodied within a mobile device such as a cellphone, tablet, and so forth.

Method 600 includes receiving a set of trigger images and a set of augmented images at 610. The trigger images and augmented images may be received from an augmented reality data server. Members of the set of augmented images may correspond to members of the set of trigger images.

Method 600 also includes providing members of the set of trigger images to a user at 620. Method 600 also includes receiving a selection from the user at 630. The selection may be associated with a member of the set of trigger images.

Method 600 also includes transmitting the member of the set of trigger images to a paired device at 640. This may cause the paired device to display the member of the set of trigger images. The paired device may be, for example, a smartwatch.

Method 600 also includes scanning the member of the set off trigger images at 650. The member of the set of trigger images may be scanned as it is being displayed by the paired device.

Method 600 also includes displaying the augmented image at 660. The augmented image may be displayed to the user. In some examples, the augmented image may be displayed such that it overlays the scanned member of the set of trigger images.

Figure 7:
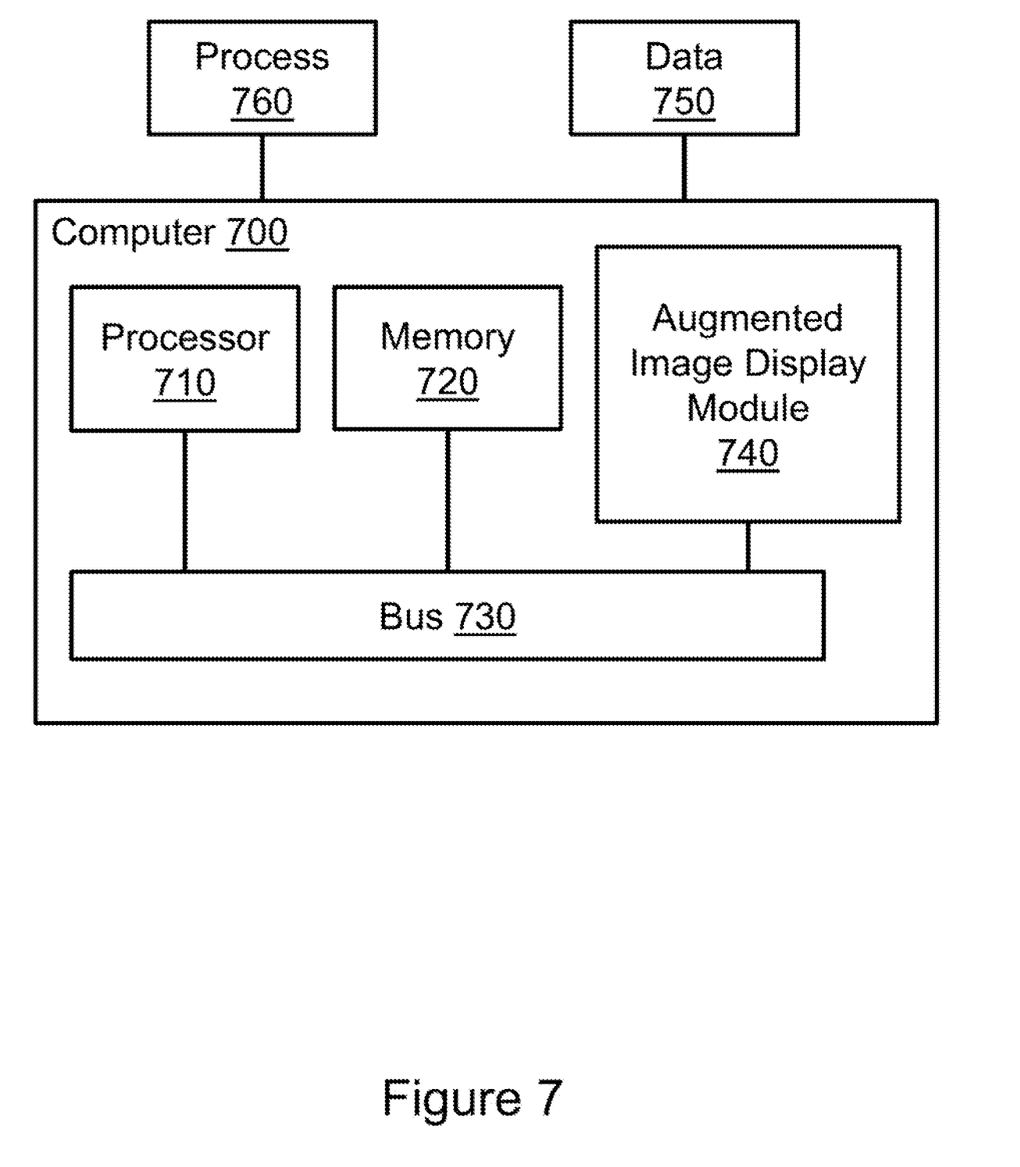
FIG. 7 illustrates an example computing device in which example systems, and methods, and equivalents, may operate.

FIG. 7 illustrates an example computing device in which example systems and methods, and equivalents, may operate. The example computing device may be a computer 700 that includes a processor 710 and a memory 720 connected by a bus 730. Computer 700 includes a displaying augmented images via paired devices module 740. Displaying augmented images via paired devices module 740 may perform, alone or in combination, various functions described above with reference to the example systems, methods, apparatuses, and so forth. In different examples, displaying augmented images via paired devices module 740 may be implemented as a non-transitory computer-readable medium storing processor-executable instructions, in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples show herein but is to be accorded the widest scope consistent with the principles and novel features disclosed herein.

What is claimed is:

1. A method, comprising:
   providing, from a mobile device to a paired device, a trigger image;
   controlling the paired device to display the trigger image;
   scanning the trigger image being displayed on the paired device into the mobile device;
   displaying an augmented image of the trigger image on the mobile device; and
   detecting a physical proximity of the mobile device to the trigger image and alert the user, via the paired device, of the physical proximity.

2. The method of claim 1, comprising receiving a user selection of the trigger image from a set of trigger images.

3. The method of claim 2, comprising receiving the set of trigger images from a trigger image distributer.

4. The method of claim 3, comprising receiving the augmented image from the trigger image distributer.

5. The method of claim 1, where the mobile device is a cellular phone and where the paired device is a smartwatch.

6. The method of claim 1, where the augmented image includes at least a portion of the trigger image.

7. The method of claim 1, where the augmented image is animated.

8. The method of claim 1, comprising modifying the trigger image to comply with a display of the paired device.

9. A system in a mobile device having a display, the system comprising:
   a data store to store a set of trigger images and corresponding augmented images;
   an augmented reality module to, upon detecting a trigger image, cause a corresponding augmented image to be shown on the display;
   a preview module to allow a user to browse trigger images and to receive an input from the user associated with a selected trigger image;
   a pairing module to control a paired device to display the selected trigger image to facilitate detection of the selected trigger image by the augmented reality module; and
   a geographic trigger module to detect a physical proximity of the mobile device to the trigger image and alert the user, via the paired device, of the physical proximity.

10. The system of claim 9, where the mobile device comprises a camera, and where the augmented reality module detects the trigger image via the camera.

11. The system of claim 9, comprising a trigger image receipt module to receive trigger images and corresponding augmented images from a control server and to store the received trigger images and corresponding augmented images in the data store.

12. A non-transitory computer-readable medium storing computer-executable instructions that when executed by a computer cause the computer to:
   receive a set of trigger images and a set of augmented images from an augmented reality data server, where members of the set of augmented images correspond to members of the set of trigger images;
   provide members of the set of trigger images to a user;
   receive a selection from the user associated with a member of the set of trigger images;
   transmit the member of the set of trigger images to a paired device to cause the paired device to display the member of the set of trigger images;
   scan the member of the set of trigger images being displayed by the paired device;
   display the augmented image to the user, overlaying the scanned member of the set of trigger images; and
   detect a physical proximity of the computer to the member of the set of trigger images and alert the user, via the paired device, of the physical proximity.

13. The non-transitory computer-readable medium of claim 12, where the computer is a cellular phone and where the paired device is a smartwatch.

* * * * *